(12) United States Patent
Martin et al.

(10) Patent No.: US 8,028,887 B2
(45) Date of Patent: *Oct. 4, 2011

(54) PORTABLE, SELF-CONTAINED SOLDERING SYSTEM

(76) Inventors: Joseph M. Martin, Campbell, CA (US); Albert L. Cook, Santa Cruz, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 12/751,855

(22) Filed: Mar. 31, 2010

(65) Prior Publication Data

US 2010/0187288 A1    Jul. 29, 2010

Related U.S. Application Data

(62) Division of application No. 12/250,656, filed on Oct. 14, 2008, now Pat. No. 7,731,074.

(51) Int. Cl.
*B23K 3/00* (2006.01)
*B23K 3/04* (2006.01)

(52) U.S. Cl. .......................... 228/51; 228/53

(58) Field of Classification Search ............ 228/51–55; 220/23.86, 336, 529, 500, 773, 772, 700, 220/699, 697, 695; 126/236–240; 219/229
See application file for complete search history.

(56) References Cited

U.S. PATENT DOCUMENTS

| | | | | |
|---|---|---|---|---|
| 538,704 A * | 5/1895 | Seaman | 126/240 |
| 1,092,725 A * | 4/1914 | Leitner | 126/236 |
| 1,354,065 A * | 9/1920 | Pruessing et al. | 126/236 |
| 1,432,801 A * | 10/1922 | Streit | 126/237 |
| 1,680,776 A * | 8/1928 | Fahlberg | 126/239 |
| 1,770,566 A * | 7/1930 | Blaskewitz | 126/240 |
| 1,853,193 A * | 4/1932 | Bicknell | 126/239 |
| 3,198,415 A * | 8/1965 | Taylor | 228/57 |
| 3,724,444 A * | 4/1973 | Varona | 126/237 |
| 4,340,029 A * | 7/1982 | Kelly, Jr. | 126/237 |
| 4,424,795 A * | 1/1984 | Plessner | 126/237 |
| 4,826,007 A * | 5/1989 | Skeie | 206/373 |
| 4,867,332 A * | 9/1989 | Mains | 220/735 |
| 4,923,394 A * | 5/1990 | Fumino | 431/343 |
| 5,048,742 A * | 9/1991 | Fortune | 228/20.5 |
| 5,174,447 A * | 12/1992 | Fleming | 206/373 |
| 5,186,329 A * | 2/1993 | Fogelberg | 206/372 |
| D345,237 S * | 3/1994 | Stein | D32/53 |
| 5,350,065 A * | 9/1994 | Darrey | 206/373 |
| 5,441,163 A * | 8/1995 | Carrasco | 220/23.86 |
| 5,472,133 A * | 12/1995 | Lin | 228/8 |
| D396,912 S * | 8/1998 | Maire et al. | D32/53 |
| 5,833,095 A * | 11/1998 | Russell et al. | 224/576 |
| 5,924,568 A * | 7/1999 | Zajonc | 206/373 |
| 6,294,759 B1 * | 9/2001 | Dunn, Jr. | 219/231 |
| 6,315,310 B1 * | 11/2001 | Hurt | 280/79.5 |
| 6,321,929 B1 * | 11/2001 | Weshler et al. | 220/555 |
| 6,360,891 B1 * | 3/2002 | Rideout | 206/373 |
| 6,536,590 B1 * | 3/2003 | Godshaw et al. | 206/373 |
| 6,823,998 B2 * | 11/2004 | Fabregas | 211/70.6 |
| 6,880,552 B1 * | 4/2005 | Veret | 126/405 |
| 7,159,735 B2 * | 1/2007 | Morse | 220/529 |
| 7,337,901 B2 * | 3/2008 | Phillips | 206/349 |
| 2007/0029215 A1 * | 2/2007 | Martinez et al. | 206/223 |

* cited by examiner

*Primary Examiner* — Kiley Stoner
*Assistant Examiner* — Carlos Gamino
(74) *Attorney, Agent, or Firm* — Schneck & Schneck; Thomas Schneck

(57) ABSTRACT

A portable soldering system has a caddy collar atop the rim of a bucket and a torch, the flame end of which may heat the tip of a soldering iron. A gas canister, connected to the torch, protrudes from the bucket through a seating opening in the side wall of the bucket. A torch mount positions the torch and the gas canister. The caddy collar has a cradle that may seat the soldering iron.

14 Claims, 3 Drawing Sheets

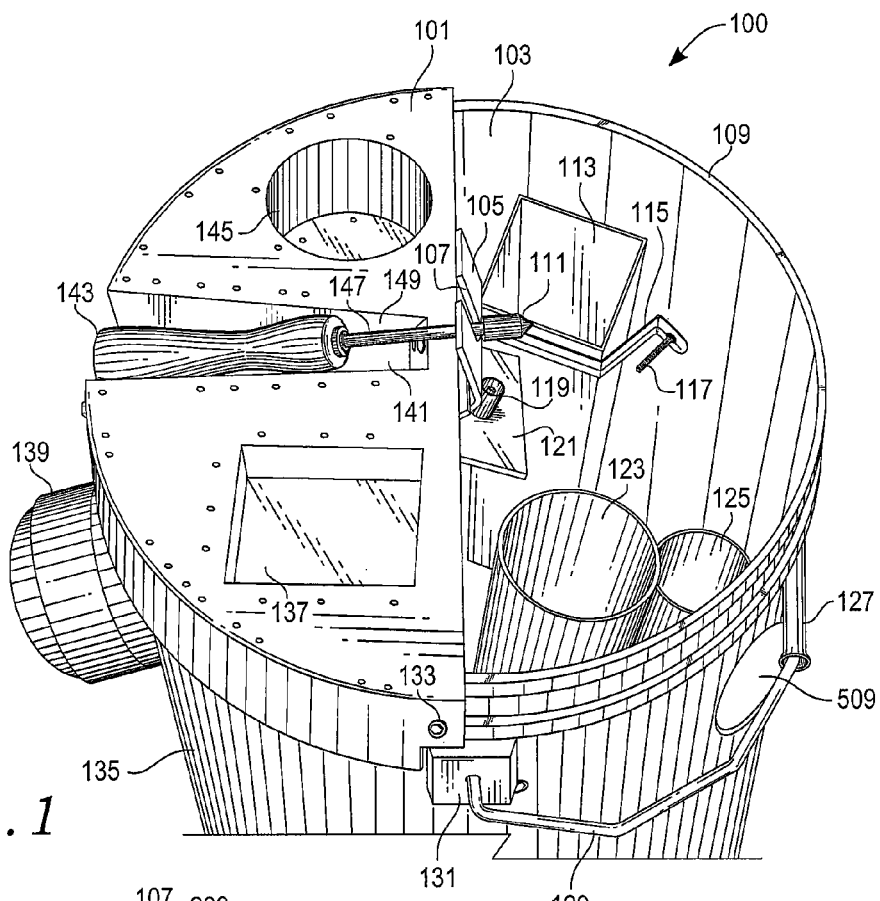

PORTABLE, SELF-CONTAINED SOLDERING SYSTEM

CROSS-REFERENCE TO RELATED APPLICATION

This application is a divisional of U.S. patent application Ser. No. 12/250,656, filed Oct. 14, 2008.

TECHNICAL FIELD

The present invention relates to gas-fueled portable soldering iron heaters.

BACKGROUND ART

In the construction industry, a sheet metal worker often uses a device for heating a soldering iron, which can easily be carried up a ladder and across a rooftop, hoisted up with a rope (prior to activating the heating element), or handed to or from a coworker. Preferably, such a device should have storage for tools and supplies needed in soldering, require little setup time, and be transportable with tools and supplies in place to eliminate extra trips up and down a ladder or to and fro across a rooftop. Past solutions had used a torch attached to a large propane tank that was heavy and bulky, or liquid fuels that were dangerous. A separate toolbox or bucket was used for carrying tools and supplies.

Prior art shows a number of devices for heating a soldering iron at a residential or commercial construction site, for example atop a roof, as is needed for soldering sheet metal. For portability, some of these devices employ a disposable or refillable propane canister, that is smaller than the type commonly used for barbecue grills. A torch, for heating the soldering iron, is attached to and receives gas from the propane canister. A heating flame, from atmospheric combustion of the propane, forms at the flame end of the torch. Both flame and flame end of the torch are typically partially or fully enclosed in an oven, the oven being constructed of metal with inside insulation. In the various devices, the propane canister may be fully enclosed and adjacent to or beneath the oven, or held in a sleeve that is attached as part of the device, or the canister may reside external to the apparatus, optionally enclosed in a removable sleeve. The soldering iron, the tip of which is being heated by the flame, may rest with its tip inside the heating oven, handle protruding partially or fully outside of the device so that it may be gripped and removed by the worker and with its shaft resting on a horizontal plate with side plates or a pair of vertically mounted plates with or without notches. One device, seen in U.S. Pat. No. 1,680,776 to Fahlberg, includes a storage compartment below the soldering iron rest area, for supplies. Another device, seen in U.S. Pat. No. 4,424,795 to Plessner, has a compartment for storing a soldering iron and a soldering material as well as an open rectangular container used to hold soldering flux.

SUMMARY DISCLOSURE

An embodiment of the present invention provides a portable soldering system that includes a caddy collar, a bucket, a torch and a gas canister. The gas canister protrudes from the bucket through a seating opening in the side wall of the bucket. A caddy collar sits atop the rim of the bucket. A torch mount connects to the torch, positioning the torch and the gas canister. The gas receiving end of the torch connects to the gas canister. A soldering iron can be seated in a cradle in the caddy collar. When the torch and gas canister are so positioned, and the soldering iron is seated in the cradle, the flame end of the torch is near to and can heat the tip of the soldering iron.

In one preferred embodiment, the cradle is a recess in the caddy collar for seating the handle of the soldering iron. The cradle may also include a cradle plate with a slot for holding the tip of the soldering iron.

In another preferred embodiment, the torch mount is a torch upper plate attached to the caddy collar. The flame end of the torch extends through a torch opening in the torch mount. The torch mount may also include a torch lower plate attached to the caddy collar. The gas receiving end of the torch extends through a connection opening in the torch lower plate.

Also in the preferred embodiment, the caddy collar has a recess for holding soldering supplies.

The portable soldering system may also include an access opening through the side wall of the bucket, allowing the user to access the torch adjustment valve.

Moreover, there may be structural features for allowing a variety of materials and supplies to be placed in and carried with the soldering system, such as one or a combination of brackets, attached or removable containers, and a middle plate with a middle plate opening.

In further preferred embodiments, there is a pivoting handle on the bucket or a clip attached to the bucket, so that the soldering system may be transported easily.

An advantage of the present invention is that the torch, torch adjustment valve and gas receiving end connected to the gas canister are all protected from damage by being within the apparatus, while the gas canister, nested in the seating opening, protrudes outside of the bucket and is thus exposed to ambient air and is less susceptible to overheating.

A further advantage of the invention is that a bucket, being part of the apparatus, is open at the top and of large volume, allowing more or larger tools and supplies to be carried than would be possible in a smaller or enclosed compartment.

BRIEF DESCRIPTION OF THE DRAWINGS

FIG. 1 is an isometric view of a preferred embodiment of the portable soldering system, showing a soldering iron seated in the cradle, with the torch flame end near the soldering iron tip and the gas canister protruding from the side wall of the bucket.

FIG. 2 is a side view of the embodiment of FIG. 1, showing the gas canister installed and protruding through the seating opening of the side wall of the bucket.

DETAILED DESCRIPTION

Figure 3:
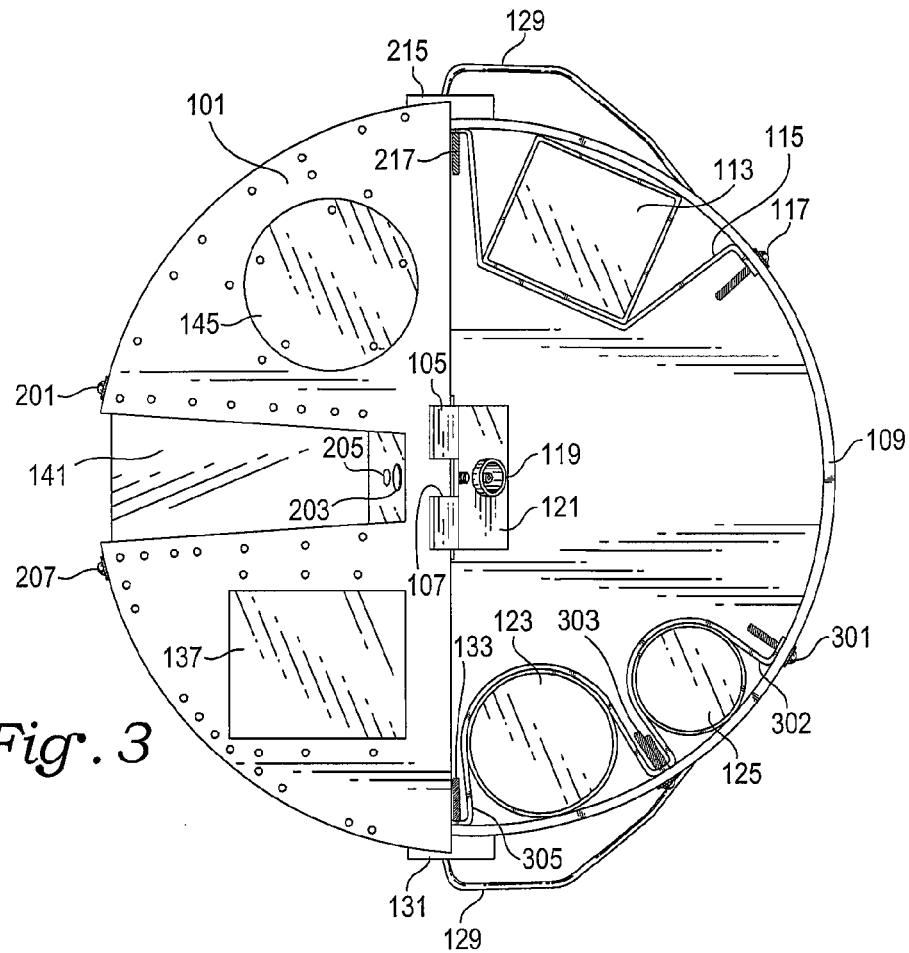
FIG. 3 is a top view of the embodiment of FIG. 1.

The preferred embodiment of the portable soldering system is shown in FIGS. 1-6.

As illustrated in FIG. 1, the preferred embodiment of the portable soldering system 100 has a caddy collar 101 atop the rim 109 of a bucket 103. A soldering iron 147 is seated in a cradle 141 in the caddy collar 101. The handle 143 of the soldering iron 147 rests in a handle recess 149 and the tip 111 of the soldering iron 147 rests in a slot 107 of a cradle plate 105. A gas canister 139 protrudes from the side wall 135 of the bucket 103. The torch mount 400 and torch 413 are shown in detail in FIG. 4. A torch mount 400 positions the flame end 119 of a torch 413 near the tip 111 of the soldering iron 147.

As illustrated in FIG. 2, the gas cylinder 139 partially extends through a seating opening 213 of the side wall 135 of the bucket 103. As known to persons skilled in the art, the gas cylinder is a readily replaceable fuel supply that is commercially available.

Figure 5:
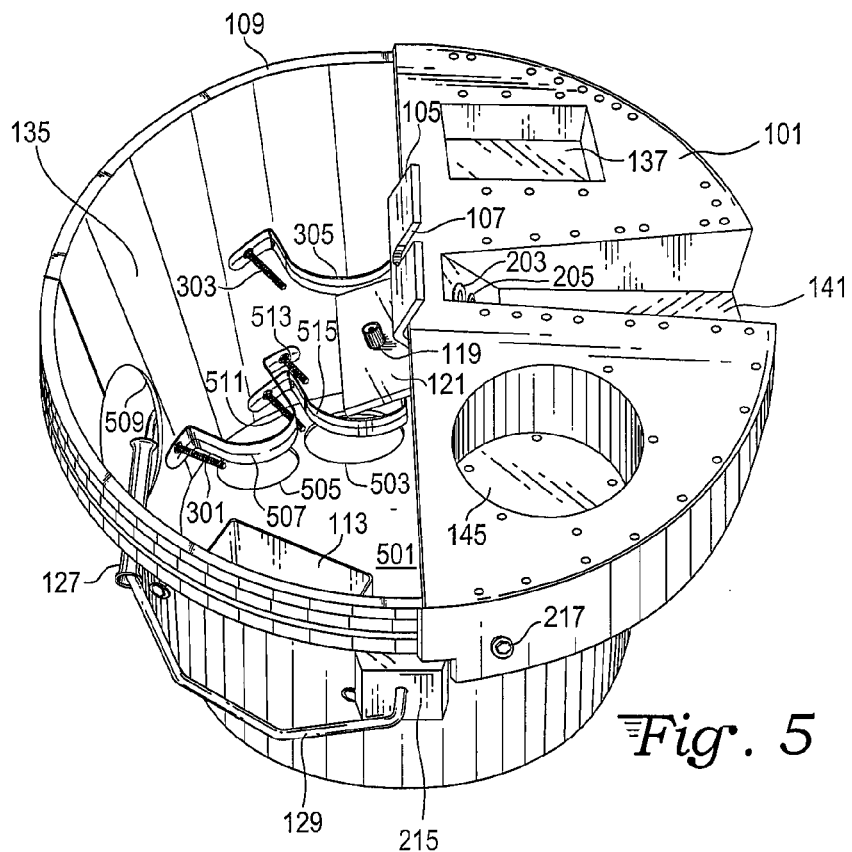
FIG. 5 is an isometric view of the embodiment of FIGS. 1, but with the containers removed.
Figure 6:
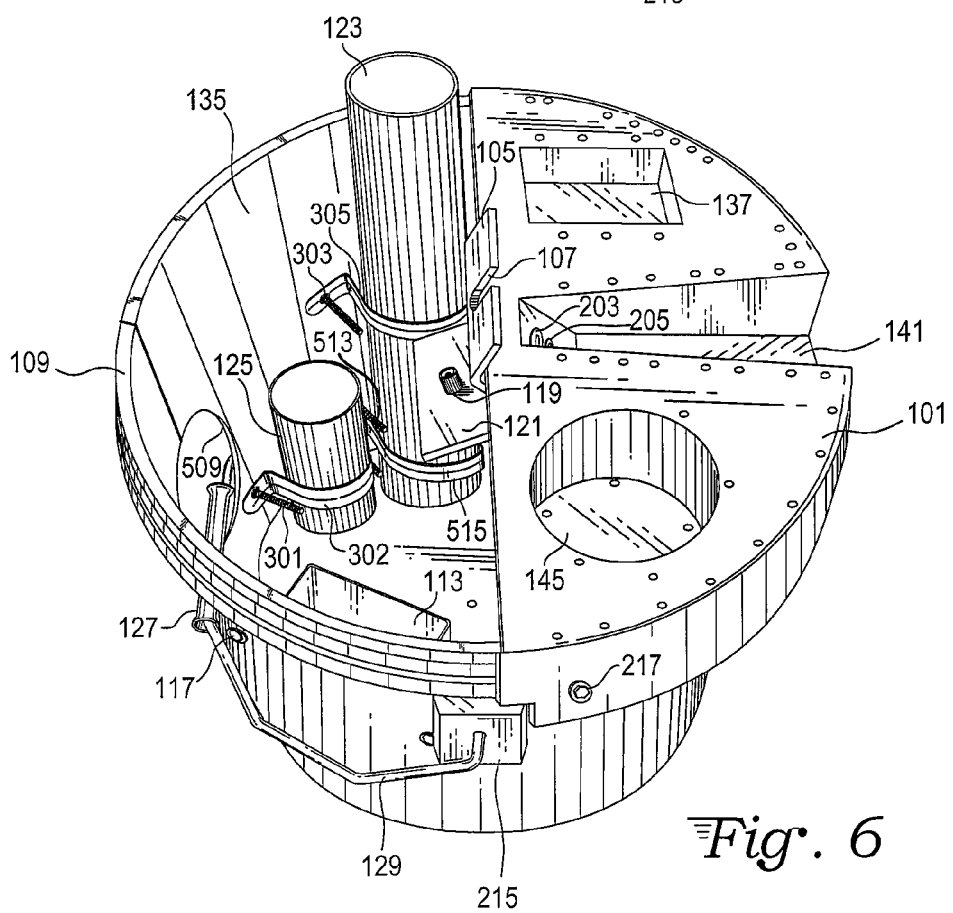
FIG. 6 is an isometric view of the embodiment of FIG. 1, showing removable containers held by brackets. The torch and gas canister are not shown in this drawing.

As illustrated in FIGS. 1-3, and 6, containers 113, 125 and 123 may be placed in the bucket 103. The containers 113, 125 and 123 may be unsecured within the bucket 103. As shown in FIGS. 3 and 6, containers 113, 125 and 123 may be secured permanently or removably by brackets 115, 302, 305, and 515. The brackets 115, 302, 305, and 515 may also be used for securing tools or supplies as needed. As shown in FIGS. 3, 5, and 6, the brackets 115, 302, 305, and 515 may be attached to the side wall 135 of the bucket 103 by fasteners 217, 117, 301, 303, 133, 511, and 513. Methods or mechanisms, such as bolts and nuts, screws, rivets, glue, welding or others known in the arts may be used for fastening or attaching. Other means for securing tools or supplies may be substituted for brackets.

Figure 4:
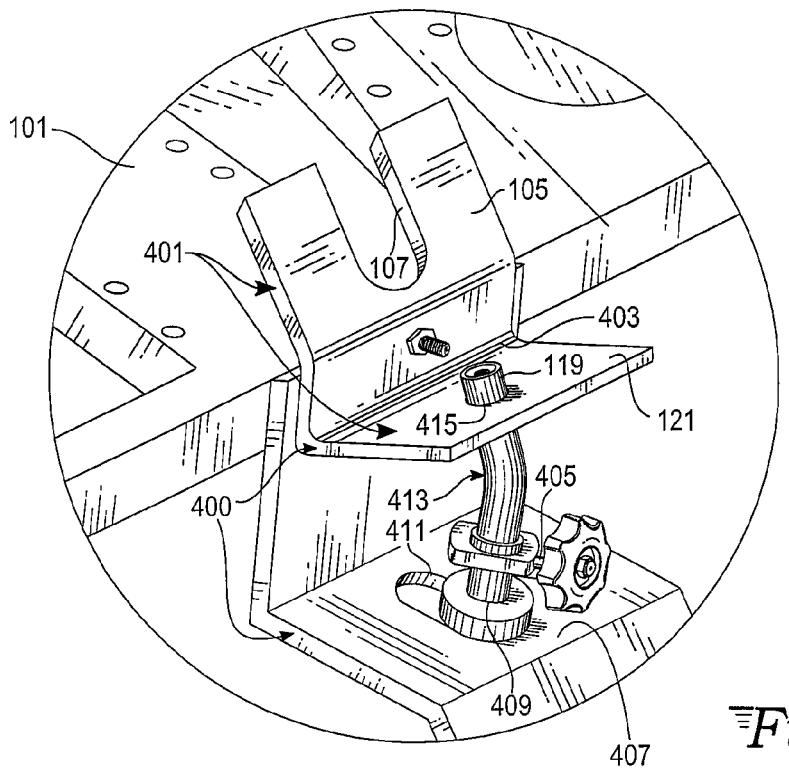
FIG. 4 is an isometric view of a preferred embodiment of the cradle plate and torch mount, showing the torch upper plate and torch lower plate along with the torch flame end and torch adjustment valve.

As illustrated in FIG. 4, the torch mount 400 has a torch upper plate 121 and a torch lower plate 407. The flame end 119 of the torch 413 extends through a torch opening 415 in the torch upper plate 121. The gas receiving end 409 of the torch 413 extends through a connection opening 411 in the torch lower plate 407.

The gas receiving end 409 of the torch 413 connects to the gas canister 139 in a manner well-known in the arts, for example by threads on the gas canister 139 engaging corresponding threads on the gas receiving end 409 of the torch 413.

In one embodiment, as shown in FIG. 4, the torch upper plate 121 and the cradle plate 105 may be formed as an integral structure 401 and attached to the caddy collar 101 with a fastener 203. Fasteners 203 and 205, shown in FIG. 2, may be used to attach to the caddy collar 101 any combination of the cradle plate 105, the torch upper plate 121 and the torch lower plate 407.

As best shown in FIG. 5, recesses 137 and 145 in the caddy collar 101 provide storage and access for materials in use during a job.

Also shown in FIGS. 1-3, 5, and 6 are a handle 129 with handgrip 127, attached to the bucket 103 by pivoting handle mounts 131 and 215. Fasteners 133, 201, 207 and 217 attach the caddy collar 101 to the bucket 103. Other locations for fasteners or other methods or mechanisms for attaching the caddy collar 101 to the bucket 103 may be used.

FIGS. 5 and 6 show an access opening 509 in the side wall 135 of the bucket 103. Manual access to the torch adjustment valve 405, shown in FIG. 4, is provided through the access opening 509.

Prior to using the soldering system 100 for heating a soldering iron 147, the torch 413 must first be installed as part of the system, followed by the gas canister 139. To install the torch 413, a worker pushes the flame end 119 of the torch 413 upwardly through the torch opening 415 in the torch upper plate 121. With the torch adjustment valve 405 closed and facing the access opening 509, the gas receiving end 409 of the torch 413 is pushed through the connection opening 411 of the torch lower plate 407. A filled gas canister 139 is pushed through the seating opening 213 and connected to the gas receiving end 409 of the torch 413. It should be verified that the torch 413 and gas canister 139 are held securely in the apparatus, with the gas canister 139 partially protruding from the bucket 103 through the seating opening 213, and that the connection of the torch 413 and gas canister 139 is free from gas leakage. Following verification, tools, containers and soldering supplies may be placed in the bucket. Brackets 115, 302, 305, 515 and attached or removable containers 113, 125, 123 can help secure supplies or tools. Soldering materials may be put in recesses 137, 145 in the caddy collar 101. One or more brushes may be placed with the handle down through the middle plate opening 503, 505 or in a container 113, the bottom of which is pushed down through the middle plate opening. Other tools or supplies may be carried likewise.

The soldering system may then be transported with all supplies in place, by lifting the handle 129 or attaching the clip to the belt of a worker. After arranging tools and materials as needed at the job site, and when ready to heat a soldering iron 147, the worker may open the torch adjustment valve 405 and ignite the torch 413 with a suitable ignition device such as a spark producing tool or a match. A soldering iron 147 may then be placed with the soldering iron handle 143 resting in the handle recess 149 and the soldering iron tip 111 resting in and projecting past the soldering iron cradle plate 105, so that the soldering iron tip 111 is heated by the torch flame. The torch flame may be adjusted or extinguished by the worker reaching through the torch valve access opening 509 and adjusting or closing the torch adjustment valve 405.

What is claimed is:

1. A portable soldering system comprising:
   a bucket having a bottom, a rim and a side wall, the side wall having a seating opening dimensioned to receive a gas canister;
   a caddy collar atop the rim and having a cradle configured to seat a soldering iron having a handle and a tip;
   a torch with a flame end and opposing gas receiving end;
   a torch mount connected to the torch to position the flame end of the torch proximate to the tip of the soldering iron when the soldering iron is seated in the cradle and to position the gas canister so as to partially extend through the seating opening of the bucket when the gas receiving end of the torch is connected to the gas canister.

2. The portable soldering system of claim 1 wherein the cradle includes:
   a handle recess descending from the caddy collar to seat the handle of the soldering iron.

3. The portable soldering system of claim 1 wherein the cradle includes a cradle plate having a slot, the slot being dimensioned to hold the tip of the soldering iron.

4. The portable soldering system of claim 1 wherein the torch mount comprises a torch upper plate attached to the caddy collar and has a torch opening through which the flame end of the torch extends.

5. The portable soldering system of claim 4 wherein the torch mount further includes a torch lower plate attached to the caddy collar and has a connection opening through which the gas receiving end of the torch extends.

6. The portable soldering system of claim 1 wherein the caddy collar has a recess configured for holding soldering supplies.

7. The portable soldering system of claim 1 wherein the side wall of the bucket is cylindrical and has an access opening, said access opening being sufficiently large to permit passage of a user's hand.

8. A portable, self-contained soldering system comprising:
   a soldering iron having a handle and a tip;
   a gas canister;
   a bucket having a bottom, a rim and a side wall connecting the rim to the bottom, the side wall having a seating opening nesting the gas canister such that a part of the gas canister protrudes outside of the bucket;

a caddy collar disposed over the rim of the bucket and having a top plate and a channel descending from the top plate defining a handle recess dimensioned to seat the handle of the soldering iron; and a torch having a gas receiving end connected to a flame end by a gas flow path, the torch being positioned within the bucket such that the gas receiving end is connected to the gas canister and the flame end is proximate to the soldering iron when the soldering iron is removably constrained by the cradle plate and the handle recess.

9. The portable, self-contained soldering system of claim 8 wherein:

the torch has a torch adjustment valve along the gas flow path between the gas receiving end and flame end; and the bucket has an access opening allowing manual access to the torch adjustment valve.

10. The portable, self-contained soldering system of claim 8 wherein a cradle plate is attached to the caddy collar, the cradle plate having a slot positioned to removably constrain the tip of the soldering iron.

11. The soldering system of claim 8 further comprising a torch mount securing a position of the torch in the bucket, the torch mount having a torch upper plate attached to the caddy collar and having a torch opening through which the flame end of the torch extends.

12. The soldering system of claim 11 wherein the torch mount additionally includes a torch lower plate attached to the caddy collar and has a connection opening through which the gas receiving end of the torch extends.

13. The soldering system of claim 8 wherein the caddy collar has at least one recess for holding soldering supplies.

14. The soldering system of claim 8 wherein the bucket has at least one bracket attached to the side wall.

* * * * *